May 13, 1930.    J. H. MURCH    1,758,369
CLOSING MACHINE
Filed Oct. 25, 1926    6 Sheets-Sheet 1

Fig. 1

INVENTOR
John H. Murch
BY Munday, Clarke
& Carpenter
ATTORNEYS

May 13, 1930.  J. H. MURCH  1,758,369
CLOSING MACHINE
Filed Oct. 25, 1926  6 Sheets-Sheet 2

INVENTOR.
John H Murch
BY Munday Clarke &
Carpenter
ATTORNEYS

May 13, 1930.  J. H. MURCH  1,758,369
CLOSING MACHINE
Filed Oct. 25, 1926    6 Sheets-Sheet 4

May 13, 1930. J. H. MURCH 1,758,369
CLOSING MACHINE
Filed Oct. 25, 1926 6 Sheets-Sheet 5

John H Murch INVENTOR.
BY Munday, Clarke & Carpenter
ATTORNEYS

Patented May 13, 1930

1,758,369

UNITED STATES PATENT OFFICE

JOHN H. MURCH, OF EAST ORANGE, NEW JERSEY, ASSIGNOR, BY MESNE ASSIGNMENTS, TO THERMOKEPT CORPORATION, A CORPORATION OF DELAWARE

CLOSING MACHINE

Application filed October 25, 1926. Serial No. 143,897.

This invention relates to a machine or apparatus for sealing or closing containers under vacuum and to an apparatus or valve for conveying the containers into the vacuum chamber for sealing without materially disturbing the vacuum within the chamber and for similarly removing the containers from the chamber.

An important object of the invention is the provision of such a device in which the vacuum may be maintained substantially constant so that air may be substantially or fully exhausted from the container and so that the container may be sealed under a substantially constant vacuum, or the like.

Another important object of the invention is to provide a valve for conveying containers into a chamber in which the air may be under conditions other than atmospheric without materially disturbing the conditions within the chamber and such a device that will also and similarly remove containers from the chamber.

A further object of the invention is the provision of an apparatus whereby filled containers are constantly and continuously conveyed into, vacuumized and hermetically closed or sealed within, and discharged from a vacuum chamber with speed and efficiency and without impairing or destroying the vacuum within the chamber to an appreciable extent.

Another and highly important object of the invention is the provision of a new and improved floating valve construction that may be interposed between a chamber in which containers or the like are to be sealed and a can carrier which permits entry of filled and unsealed containers from the can carrier into the chamber and the discharge of sealed containers from the chamber without materially disturbing the conditions within the chamber.

Another important object of the invention is the provision of such a floating valve device which is self-adjusting and which will exert an even and predetermined pressure at the points of connection with the vacuum chamber and the can carrier.

Another important object of the invention is to provide a can carrier for supplying containers to a chamber and removing containers therefrom of new and improved construction.

Another important object of the invention is to provide a non-floating can carrier or a can carrier for conveying cans into the vacuum chamber through a flexible valve member or for co-operating with a flexible or yieldable valve member for conveying cans into a vacuum chamber and such a device that is rotatably mounted in a fixed position with respect to the closing machine or vacuum chamber so that its position may be constant and that an adjustable means may be interposed between a can conveyer and the vacuum chamber that may be adjusted independent of the conditions or pressure within the chamber to vary the pressure against the can carrier or frictional contact between the can carrier and said member and to thereby reduce the power required to operate the machine and to reduce the wear of the parts.

Numerous other objects and advantages of the invention will be apparent as it is better understood from the following description, which, taken in connection with the accompanying drawings, discloses a preferred embodiment thereof.

Referring to the drawings.

To illustrate my invention I have shown a closing machine or apparatus that is adapted for closing containers or cans that are filled in normal atmospheric conditions and closing the cans within the chamber which may be under any other than normal atmospheric conditions, such as under a vacuum when it is desired to vacuumize the cans before sealing and under a pressure above atmospheric pressure or either under vacuum or pressure and containing gases or the like, and to accomplish this I have shown a base 11 which may be attached to or form a part of frame parts 12 and 13, a housing 14 mounted upon the frame part 12 and formed to provide a chamber 15 in which a closing or seaming head 16 may be mounted, a conveyer 17 for moving containers or cans into the chamber, conveying mechanism 18 for delivering the cans to the conveyer 17 and a float valve 19 for sealing the space about the conveyer 17 and for cooperating with this conveyer to permit of delivering cans to the chamber 15 and preferably withdrawing the cans therefrom without materially disturbing the conditions within the chamber.

Figure 1:
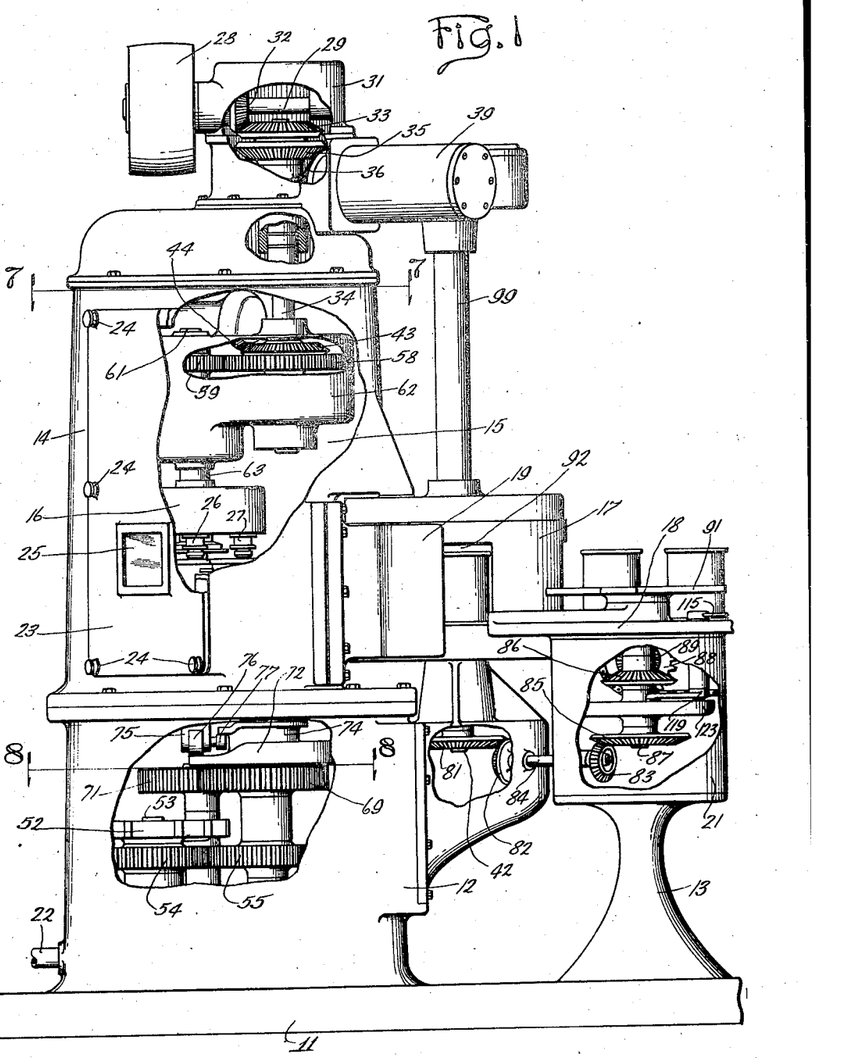
Figure 1 is an elevational view of a device embodying my invention and having parts thereof broken away to show details of construction.
Figure 2:
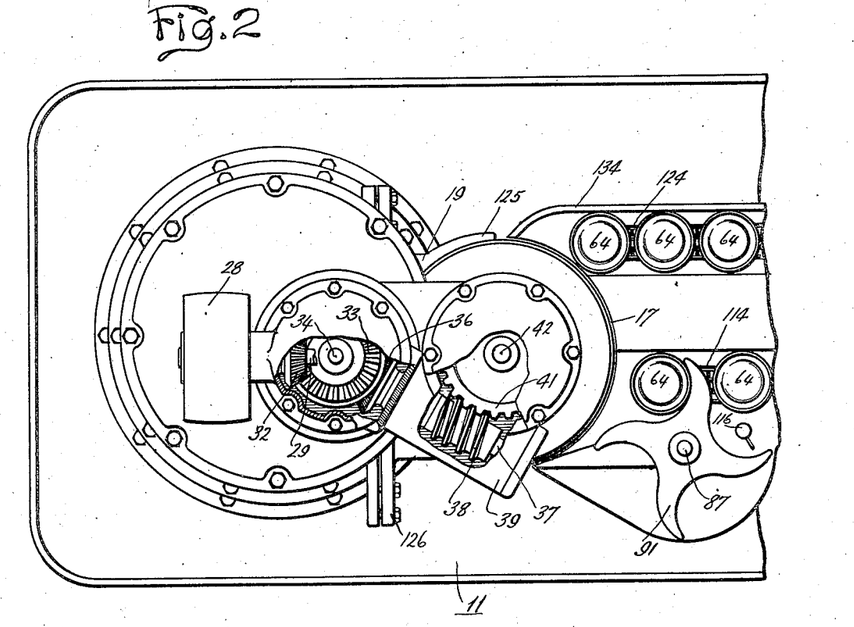
Fig. 2 is a top plan view of the device shown in Fig. 1, also having parts thereof broken away to show details of construction.
Figure 3:
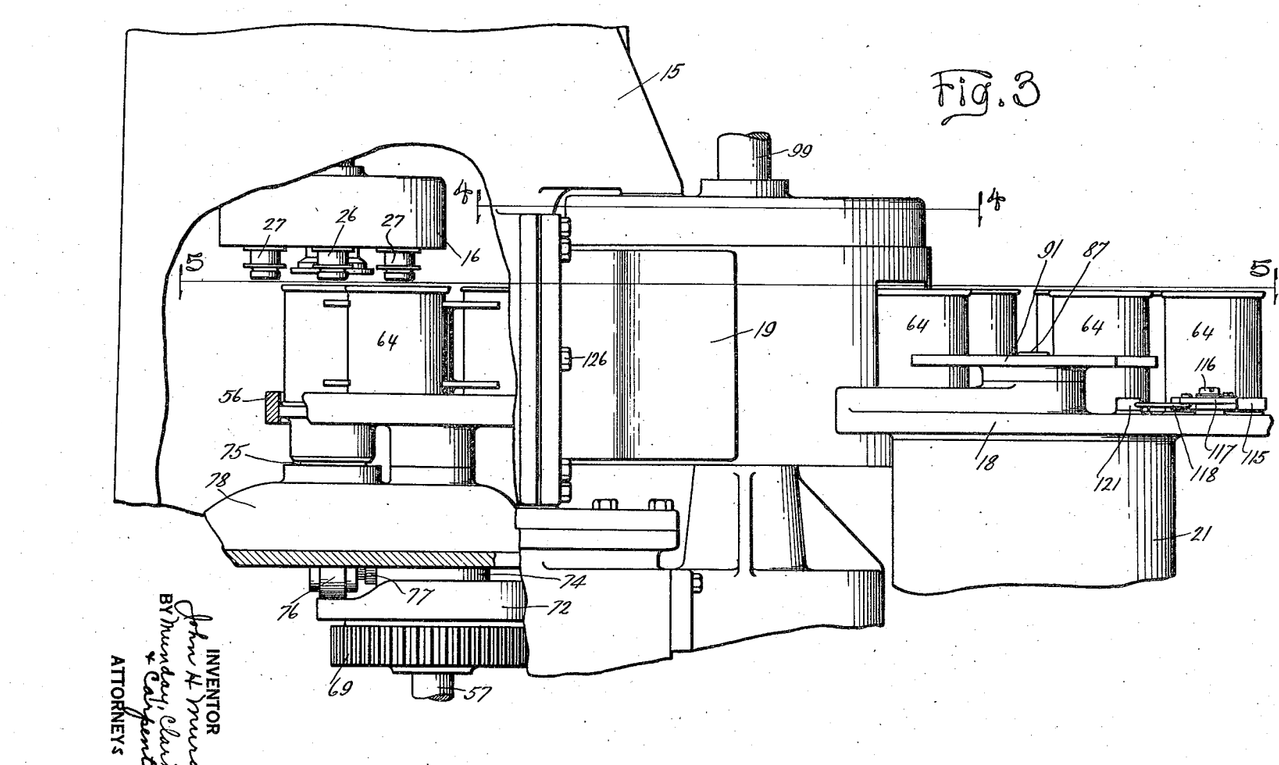
Fig. 3 is an enlarged view of a portion of the device shown in Fig. 1 showing the float valve, conveyer and seaming mechanism within the chamber.

The frame parts 12 and 13 may be formed in any suitable manner to support the operative mechanism in proper relation and the frame part 12 is preferably formed of solid walls to provide an enclosure in which transmission devices may be mounted, a housing part 21 on the frame part 13 may be similarly formed. The housing 14 may be of any suitable shape that will enclose the seaming mechanism and that will provide a complete enclosure above frame part 12 that preferably cooperates with the housing 14 to provide the chamber 15. The housing part 12 is preferably formed on a flat base so that the lower end will be closed. A pipe 22 may be attached to the frame part 12 substantially as shown (Fig. 1) in any suitable manner such as by threaded engagement therewith, or to the housing 14 that may be extended to any source of supply or the like for controlling the conditions within the chamber 15. A door 23 may be provided on the housing 14 that is removably mounted by means of a plurality of cap screws 24 or other devices to facilitate removal of the door to permit of access to the seaming head 16 and the chamber 15. The door 23 is preferably provided with a transparent window 25 to permit an operator to observe the mechanical action within the chamber 15. The seaming head 16 may be any suitable device that will secure a cover to a container such as a roll seaming head or a die forming device that will tightly close the containers and in the present instance I have shown a double seaming roll type of seaming head that is provided with seaming rolls 26 and 27 of which there are usually two of each provided and either pair of which may be the first or second seaming operation rolls. Power is delivered to the seaming head 16 and to the other operating parts of the machine through a pulley 28 mounted on a shaft 29 that is supported in a housing 31 suitably mounted on top of the housing 14 or in any suitable position to transmit power to the machine from any suitable source of power. A bevel gear 32 on the shaft 29 meshes with a bevel gear 33 secured to a vertical shaft 34. Just below gear 33 another bevel gear 35 is secured to shaft 34 and meshes with a bevel gear 36 secured to a horizontal shaft 37 (Fig. 2) which carries a worm 38 within a housing 39. The worm gear 38 meshes with a gear 41 on a vertical shaft 42 which extends downwardly from the housing 39 and is keyed or otherwise secured to the gear 41 for driving the conveyer 17 and the conveying mechanism 18 as will be later described. The shaft 34 extends into the housing 14 and carries a bevel gear 43 that is arranged to mesh with a bevel gear 44 on a horizontal shaft 46 (Figs. 1 and 7) which carries at its outer end a worm 47 arranged to mesh with a worm gear 48 keyed to a shaft 49 substantially as shown that carries at its opposite end a Geneva arm and segment 51 that is arranged to cooperate with a Geneva wheel 52 secured to a vertical shaft 53 which through gears 54 and 55 (Figs. 1 and 5) impart step by step movement to an intermittent carrier 56 secured to a shaft 57. A spur gear 58 is also secured to the shaft 34 and meshes with a pinion 59 that is mounted on a shaft 61 arranged to carry the seaming head 16 and supported in a housing 62 formed to enclose the gears to permit of submerged lubrication and to support the seaming head 16 in a predetermined position in the chamber 15. The shaft 61 extends through a sleeve 63 that is arranged to control seaming movement of the rollers 26 and 27 and may be provided with any suitable connection with the rollers and between the shafts 61 and 34 or in the usual manner for obtaining a desired operation. Cans or containers 64 are delivered to the chamber 15 through an opening 65 in a wall 66 thereof into pockets 67 of the carrier 56 and are carried to and from a seaming position thereby which may be any desired position within the chamber and is determined by the position of the seaming head 16. A suitable guide rail 67' may be provided for holding the cans in the pockets 67. In the present instance movement of the can is intermittent because a seaming machine having a single seaming head is used, but it will be understood that where a larger machine, having multiple spindle seaming apparatus, is desired the cans may be moved about the chamber continuously and seamed during their movement within the chamber. When the single seaming head and the intermittent movement is used the can is lifted into the seaming rolls or into position to be engaged by the seaming rolls at a position indicated by the position of a can 68. This lifting movement is accomplished by a gear 69 rotatably mounted on the shaft 57 a gear 71 mounted on the shaft 49 and a cam 72 supported on the gear 69 and rotated thereby through a plurality of pins 73 arranged on the face of the gear and to engage the cam (see Figs. 1 and 8). The cam 72 is provided with a cam groove 74 that is arranged to lift the can into the seaming rolls at the proper instant through the instrumentality of a lifting plunger 75 carrying rollers 76 and 77 at its lower extremity for engaging the cam 72 and its cam groove. The plunger 75 extends through a wall 78 of the housing and engages a can in the intermittent carrier 56 to lift the can into the rolls (see Fig. 3).

Figure 4:
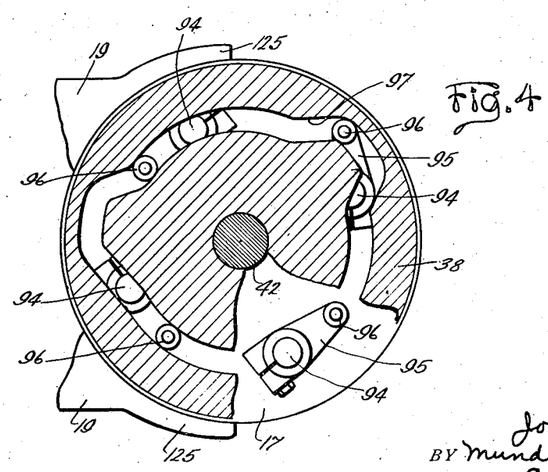
Fig. 4 is a section taken substantially on line 4—4 in Fig. 3.

The conveyer 17 that conveys the cans to and from the opening 65 or into and out of the chamber 15 is or may be keyed to the shaft 42 to rotate therewith and the shaft 42 extends below the conveyer 17 to permit of connecting a bevel gear 81 arranged to drive the conveying devices 18 through bevel gears 82 and 83 mounted on a shaft 84, bevel gears 85 and 86 mounted on a shaft 87 suitably supported in the housing 21 and arranged to drive a sprocket 88 through a bevel gear 89 meshing with the bevel gear 86 and a timing device or star wheel 91 suitably secured to an end of the shaft 87 and located above the housing 21. The conveyer 17 is preferably of substantially cylindrical form and provided with a plurality of recesses or pockets 92 arranged about the periphery thereof and of sufficient size to house a container 64 of maximum size substantially as shown. A lever 93 pivoted on a stub shaft 94 (see Figs. 5 and 6) having a bearing in the conveyer is arranged to extend into each pocket 92 and formed substantially as shown so that rotation of the stub shaft 94 in a clock-wise direction will cause the discharge of the containers or cans 64 from the pockets 92. The shaft 94 (Figs. 4 and 6) extends through the top of the conveyer substantially as shown and a cam arm 95 is provided for engaging in a cam groove 97 in a plate 98 that is arranged on and supported by the conveyer 17 and rigidly secured to a sleeve 99 that is suitably secured to the housing 39 to prevent rotation of the plate 98 and encloses the shaft 42. The plate 98 is preferably supported on the conveyer 17 through a flange 112 extending therefrom, which also provides a space or chamber 113 in which the cam arms 95 may be arranged and operated.

Cans are delivered to the conveyer 17 by a chain 114 or other conveying device that is controlled to deliver only one container at a time to the conveyer by means of the star wheel 91 and a holding lever 115 that is pivoted at 116 on the housing 21 and connected by a link 117 to a spring 118 that is controlled by a cam arm 119 pivoted at 121 and arranged to engage in a cam groove 122 of a cam 123 that is suitably secured to the shaft 87. Cans are or may be received from the conveyer and conveyed away by means of a conveyer chain 124 similarly driven and arranged to receive cans from the pockets 92 substantially as shown. The valve member 19 is arranged over the opening 65 and to engage the periphery of the conveyer 17 substantially as shown (Fig. 5) or between the chamber 15 and the conveyer and is provided with means for adjusting or compensating for wear of the parts and controlling the operating pressure between the parts for sealing the joints or providing an air-tight joint between this member and the conveyer and between this member and the chamber. To accomplish this the valve member 19 is formed to embrace a portion of the periphery of the conveyer 17 that is large enough to include at least one of the pockets 92 or fractional parts or all of more than one of these pockets so that while the pockets are adjacent the opening 65 the surface of the conveyer 17 about the pockets will be sealed against the passage of air either into or out of the chamber 15. This is accomplished by forming wings 125 to embrace the periphery of the conveyer substantially as shown. A base part 126 of the valve member 19 is formed substantially in accordance with the opening 65 and for non-rigid and loose attachment thereto by means of threaded devices or studs 126' having threaded engagement with the housing 14. A groove is formed about the opening 65 that may be either formed in the housing 14 or in the portion 126 of the valve member 19 and that may be of any suitable form in which a resilient or flexible tubular member 127 may be arranged. The tubular member is provided for the purpose of sealing the joint between the portion 126 of the valve member 19 and the portion 66 of the housing 14 and to accomplish this fluid under pressure such as air or the like is forced into the tubular member 127 and the pressure may be brought up to any desired extent to cause the valve 19 to bear against the conveyer 17 and to follow the surface thereof as it may wear in operation or under operating pressure. That part of the tubular member 127 which is against the part 126 consequently moves towards or away from the wall 66 of the chamber 15, though the movement is slight, according to any eccentricity, wavering or inequality of the air-sealing surface of the conveyer; and the valve member 19, is a part, separate from the conveyer, and separate from the chamber 15, which is movable slightly towards and from the chamber according to any such inequality of movement of said air-sealing surface of the conveyer.

Figure 5:
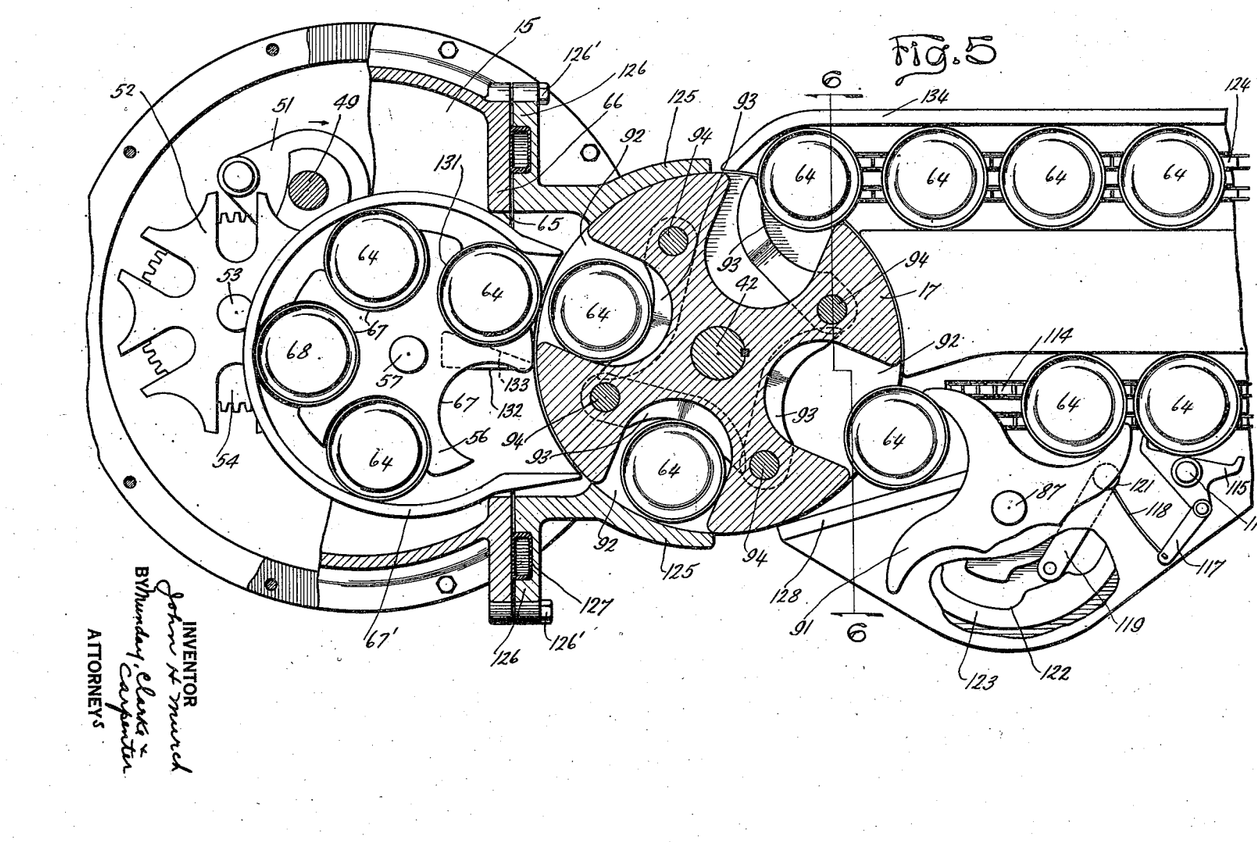
Fig. 5 is a section taken substantially on line 5—5 in Fig. 3.
Figures 6, 7, 8:
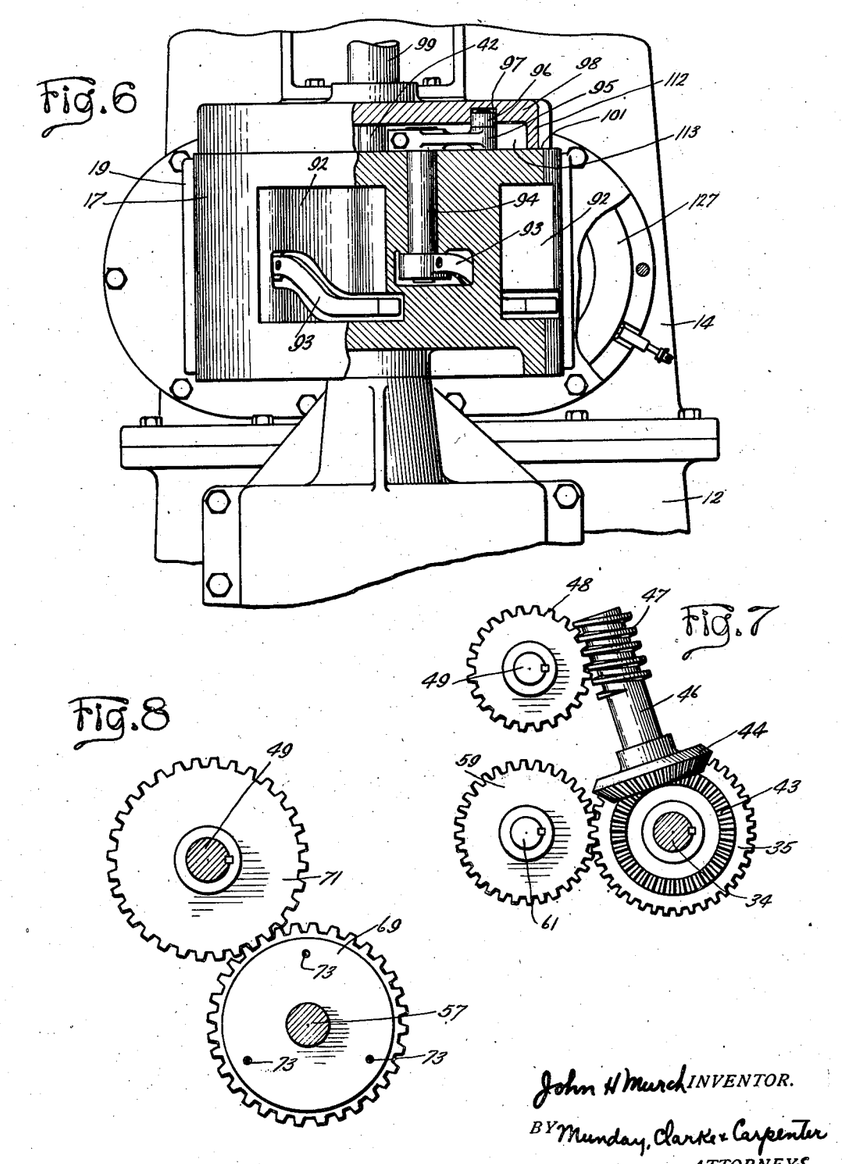
Fig. 6 is a section taken substantially on line 6—6 in Fig. 5, with parts of the conveying mechanism omitted.
Figs. 7 and 8 are sections taken substantially on line 7—7 and 8—8 respectively in Fig. 1.
Figure 9:
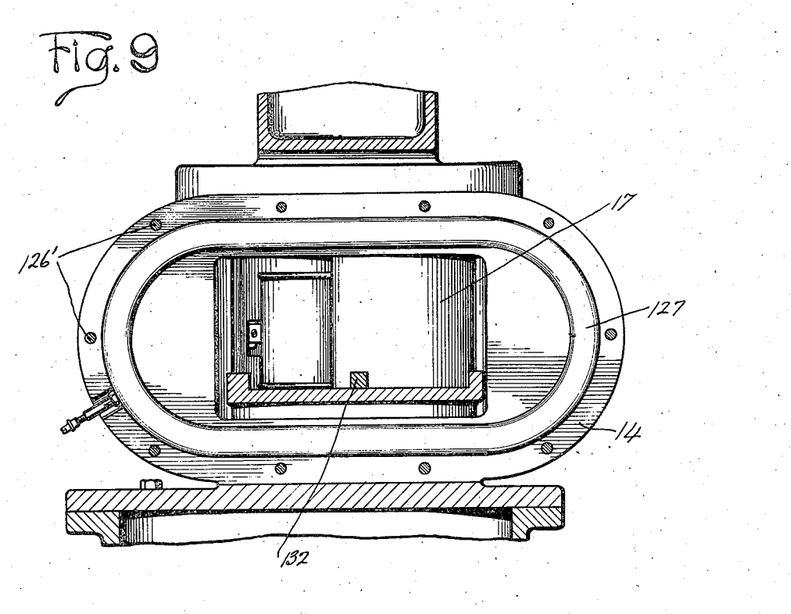
Fig. 9 is a section taken substantially on line 9—9 of Fig. 5.

The seaming head is operated through the train of gears above described to periodically repeat seaming operations and the intermittent conveyer or carrier 56 is operated through gearing mechanism as above described to present one of the pockets 67 at the seaming station for each seaming operation of the seaming head so that when cans are carried by this intermittent carrier they will be seamed at the seaming station or while within the chamber 15. The cans pass freely beneath the seaming head 16 and when at the seaming station they are lifted into position to be engaged by the seaming rolls 26 and 27 by means of the cam 72 and the plunger 75. Cans are delivered to the conveyer 17 from the conveying chain mechanism 114 periodically or in spaced relation by the lever 115 and the star wheel 91. The star wheel is arranged so that the cans will be moved into one of the pockets 92 of the conveyer by the cooperative action of the star wheel and a guide 128 which may be of any suitable form and is preferably of the form shown (Fig. 5). At the time the cans 64 are delivered into the pockets 92 the levers or fingers 93 are in the retracted position or at the bottom of the pockets so that the cans may pass freely into the pockets as the conveyer is rotated and successive pockets are presented to receive cans. The containers or cans are carried by the conveyer 17 in a substantially circular path past the portion 125 of the valve member 19 and discharged into the chamber 15 and into the pockets 67 of the intermittent conveyer 56, the cam groove 97 is so formed that each finger or lever 93 will swing about its pivot and discharge the cans from the pockets 92 at the proper instant and shortly before movement of the intermittent conveyer 56. After the cans have been removed from the pockets the intermittent conveyer moves in a clock-wise direction, viewing Fig. 5. The levers 93 are retracted by the cam groove 97 and the can or container that is in a position or pocket 131 in the intermittent conveyer is moved into the empty pocket 92 by the relative movement of the intermittent conveyer 56 and a wedge block 132 having a wedge surface 133 for wedging the cans from the pockets 67 of the intermittent conveyer. Further rotation of the conveyer 17 brings the cans to the discharge station or adjacent the conveyer mechanism 124 where another movement of the levers 93 moves the cans from the pockets 92 and on to the conveying mechanism, a guide 134 guides the cans on to the conveying devices. It will be understood that the conveying devices 114 and 124 together with the star wheel 91 and cooperating mechanisms may be omitted, if desired, and that the pockets may be filled by hand and merely discharged into a suitable chute upon occasion. The chamber 15 may have any desired condition that is desirable for closing containers and while I have shown the machine arranged to seal containers in a vacuum or for vacuumizing containers and provided only one pipe 22 for withdrawing air from the chamber 15 it will be understood that other such pipes may be provided for passing a fluid through the chamber, such as gases or the like or that through the single pipe connection air or other fluids may be pumped into the chamber to create a pressure or other condition that is other than a normal atmospheric condition and in either of the above instances that the valve part or member 19 seals the space about the conveyer 17 so that the only change of air or disturbance of condition within the chamber 15 will be the air admitted to the chamber or withdrawn from the chamber by the pockets 92 that are so arranged and covered that while one may tend to break down the condition within the chamber 15, the other tends to compensate or to assist in maintaining the condition within the chamber. For instance, when cans are being closed in a vacuum the pocket entering the chamber will deliver a small charge of air which occupies the space about the container into the chamber tending to destroy the condition in the chamber and on leaving the chamber or moving to discharging position the pocket tends to assist in maintaining the condition within the chamber by removing a quantity of fluid similar to that delivered to the chamber by the pocket when it entered. The tubular member 127 is preferably a rubber tube that is formed substantially as the inner casing of a pneumatic tire and may be provided with any suitable means for locking the air within the casing, such as a check valve. Air is pumped into this tube so that the walls of the tube will tightly engage the opposing surface of the portions 66 and 126 of the housing 14 and the member 19 respectively to seal the space between these surfaces so that no fluid will pass and the expanding movement of the tubular member is such that it tends to separate these two portions and act as a pressing means to move the portions 125 of the member 19 against the peripheral surface of the member 17. This tendency may be limited by the cap screws 126' having threaded engagement with the portion 66 of the housing 14 and by adjustment of these screws the pressure on the conveyer 17 may be limited in accordance with the requirements of the machine so that a substantially air-tight seal may be effected without an undue frictional strain on the machine. The portions 125 of the member 19 engage the peripheral surface of the conveyer 17 substantially throughout its height and a width slightly greater than the pockets 92 at two spaced points and along a band adjacent its top and bottom or above and below the conveyer pockets and the opening 65 is of a size that will permit at least one of the pockets 92 to be in communication with the opening at all times. While I have shown cans with their covers positioned on them ready for seaming being delivered to the conveyer 17 it will also be noted that upon occasion means may be provided for feeding and assembling covers to the containers within the chamber 15.

It is to be understood that I do not wish to limit myself to the particular construction of my floating valve member, nor to said member and its mechanical equivalents in combination with the particular closing machine shown, but it will be readily apparent that with slight changes in the construction of the combined mechanisms my improved floating valve construction may be employed in connection with double seaming under pressure or double seaming under gasing or in connection with a great many other filling and closing operations and machines.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In an apparatus for vacuumizing and sealing containers, the combination of a vacuum chamber having an opening therein, seaming mechanism in said chamber, conveying mechanism adjacent said chamber for delivering cans thereto including a device having a plurality of can receiving pockets, and means positioned between said last mentioned device and the opening in said chamber adapted to seal the can receiving pockets through a predetermined movement of said device and yieldingly connected to said chamber.

2. In an apparatus for vacuumizing and sealing containers, the combination of a vacuum chamber having an opening therein, a rotary can conveying device having a plurality of can receiving pockets therein, a casing embracing a portion of said rotary can conveying device and a plurality of pockets and formed to extend therefrom and in the direction of the vacuum chamber, and means including fluid under pressure for sealing the space between said vacuum chamber and said casing.

3. In an apparatus for vacuumizing and sealing containers, the combination of a vacuum chamber having a separate movable part provided with an opening therein, a rotary can conveying device having a plurality of can receiving pockets therein, and a flexible expanding and sealing member interposed between the two parts of said vacuum chamber and constantly sealing the joint between the parts of the vacuum chamber and holding said movable part in tight contact against said conveying device.

4. In an apparatus for vacuumizing and sealing containers, the combination of a vacuum chamber having an opening therein, a rotary can conveying device having a plurality of can receiving pockets therein, a casing embracing a portion of said rotary can conveying device and a plurality of pockets and formed to extend therefrom and in the direction of the vacuum chamber, and a member of flexible material arranged between said casing and said housing to provide an air-tight joint and permit of adjustment.

5. In an apparatus for vacuumizing and sealing containers, the combination of a vacuum chamber having an opening therein, a nonfloating can carrier for conveying cans into said opening, a floating valve interposed between the vacuum chamber and the can carrier and embracing a portion of the can carrier, and a flexible member extending between said floating valve member and said vacuum chamber.

6. An apparatus for closing containers and the like, comprising, seaming mechanism arranged in a chamber having an opening therein, means in the chamber for moving containers from said opening and through the seaming mechanism back to said opening, a rotating conveyor mounted adjacent said opening and adapted to deliver containers thereto and to receive containers therefrom, and means co-operating with said rotatable conveyer for sealing the opening.

7. An apparatus for closing containers and the like, comprising, seaming mechanism arranged in a chamber having an opening therein, means in the chamber for moving containers from said opening and through the seaming mechanism back to said opening, a rotating conveyer mounted adjacent said opening and adapted to deliver containers thereto and to receive containers therefrom, and means including a flexible tube for co-operating with said rotatable conveyer for sealing the opening.

8. An apparatus for closing containers and the like, comprising, seaming mechanism arranged in a chamber having an opening therein, means in the chamber for moving containers from said opening and through the seaming mechanism back to said opening, a rotating conveyer mounted adjacent said opening and adapted to deliver containers thereto and to receive containers therefrom, and means cooperating with said rotatable conveyer for sealing the opening, said means including a flexible tube and a member arranged to support the tube and to embrace a portion of the rotatable conveyer.

9. An apparatus for closing containers and the like, comprising, seaming mechanism arranged in a chamber having an opening therein, means in the chamber for moving containers from said opening and through the seaming mechanism back to said opening, a rotating conveyer mounted adjacent said opening and adapted to deliver containers thereto and to receive containers therefrom, and means for sealing the space between the seaming mechanism and said rotatable conveyer, comprising, a frame arranged to embrace a portion of said conveyer, and means including fluid under pressure for urging said frame toward said conveyer.

10. An apparatus for closing containers and the like, comprising, seaming mechanism arranged in a chamber having an opening therein, means in the chamber for moving containers from said opening and through the seaming mechanism back to said opening, a rotating conveyer mounted adjacent said opening and adapted to deliver containers thereto and to receive containers therefrom, means for sealing the space between the seaming mechanism and said rotatable conveyer, comprising, a frame arranged to embrace a portion of said conveyer, means including fluid under pressure for urging said frame toward said conveyer, and means for limiting the effect of said last mentioned means on said conveyer.

11. An apparatus for closing containers and the like, comprising, seaming mechanism arranged in a chamber having an opening therein, means in the chamber for moving the containers from said opening and through the seaming mechanism back to said opening, a rotating conveyer mounted adjacent said opening and adapted to deliver containers thereto and to receive containers therefrom, means for sealing the space between the opening and said rotatable conveyer, comprising, a frame arranged to embrace a portion of said conveyer, means including fluid under pressure for urging said frame toward said conveyer, and means for limiting the effect of said last mentioned means on said conveyer, said last mentioned means being adjustable to compensate for wear.

12. An apparatus for closing containers and the like, comprising, seaming mechanism, a housing providing an air-tight chamber about said seaming mechanism and having an opening therein, a rotatable conveyer for conveying containers to and from the chamber, and a bracket secured to said housing over the opening therein and formed to embrace a portion of the rotatable conveyer, said bracket and said rotatable conveyer being formed to cooperate to seal the opening, and means pressing said bracket away from the housing and against said conveyer.

13. An apparatus for closing containers, comprising, seaming mechanism, an air-tight housing arranged about said seaming mechanism and having an opening therein, a substantially cylindrical conveyer rotatably mounted adjacent said housing and having a plurality of container receiving pockets in the periphery thereof, a bracket arranged to embrace a portion of the periphery of said conveyer and having an opening formed substantially in accordance with the opening in said housing, and pressing means arranged between said bracket and said housing and about the opening for sealing the joint therebetween, said pressing means being adapted to hold said bracket in frictional engagement with said conveying means.

14. In an apparatus of the character described, the combination with a vacuum chamber of a rotary can conveying wheel adjacent said chamber, a casing contacting the periphery of the conveying wheel and extending from the chamber and means operable by fluid under pressure for adjusting the casing relative to the periphery of the wheel.

15. In an apparatus for vacuumizing and sealing containers, the combination of a vacuum chamber having an opening therein, a non-floating can carrier for conveying cans into said opening, a floating valve interposed between the vacuum chamber and the can carrier and embracing a portion of the can carrier, and a flexible member interposed between said floating valve member and said vacuum chamber and fluid means for extending said flexible member.

16. An apparatus for vacuumizing and sealing containers, the combination of a vacuum chamber having an opening therein, a non-floating can carrier mounted adjacent said opening and adapted to deliver cans thereto, a floating valve member frictionally engaging and embracing a portion of said can carrier and flexible means interposed between said floating valve member and the vacuum chamber, said flexible means being adjustable to vary the frictional engagement between the floating valve member and the can carrier.

17. In an apparatus for vacuumizing and sealing containers, the combination of a vacuum chamber having an opening therein, means in the chamber for moving containers from said opening and through the seaming mechanism back to said opening, a rotating conveyer mounted adjacent said opening and adapted to deliver containers thereto and to receive containers therefrom, and a compressible and outwardly expanding member interposed between said rotating conveyer and the chamber for sealing the space about the opening and between the chamber and the conveyer.

18. In an apparatus for vacuumizing and sealing containers, the combination of a frame having a portion of a vacuum chamber, sealing mechanism operating in said portion of a chamber, a can carrier formed with pockets each of which is adapted to be brought into position in relation with said portion of the chamber to form a part of a complete vacuum chamber, whereupon a can which has been conveyed by said pocket and placed in line with the seaming mechanism may be operated on and hermetically sealed thereby while in said vacuum chamber, and a floating element separate from said carrier and from said frame and slightly movable relative thereto, and subject to atmospheric pressure and interposed between said carrier and said frame and acting with said carrier to seal said vacuum chamber during the seaming operation.

19. In an apparatus for vacuumizing and sealing containers, the combination of a frame having a portion of a vacuum chamber, sealing mechanism operating in said portion of a chamber, a can carrying turret formed with pockets each of which is adapted to be brought into position in relation with said portion of the chamber to form a part of a complete vacuum chamber, whereupon a can which has been conveyed by said pocket and placed in line with the seaming mechanism may be operated on and hermetically sealed thereby while in said vacuum chamber, and a floating element separate from said turret and from said frame and slightly movable relative thereto, and subject to atmospheric pressure and interposed between said turret and said frame and acting with said turret to seal said vacuum chamber during the seaming operation.

20. In an apparatus for vacuumizing and sealing containers, the combination of a frame having a portion of a vacuum chamber, sealing mechanism operating in said portion of a chamber, a can-carrying turret formed with pockets each of which is adapted to be brought into position in relation with said portion of the chamber to form a part of a complete vacuum chamber, whereupon a can which has been conveyed by said pocket and placed in line with the seaming mechanism may be operated on and hermetically sealed thereby while in said vacuum chamber, and a floating element separate from said turret and from said frame and slightly movable relative thereto and subject to atmospheric pressure and interposed between the convex face of said turret and said frame and acting with said turret to seal said vacuum chamber during the seaming operation, and a hollow expansible fluid container tending to move said floating element away from said frame and against said turret.

21. In an apparatus for vacuumizing and sealing containers, the combination of a vacuum chamber having an opening therein, a rotary can carrier for conveying cans into the opening in the vacuum chamber and a floating valve member connected with and movable relative to said chamber and interposed between said carrier and said chamber and having an air sealing contact with the said carrier, and having an aperture for the passage of cans from the carrier into said chamber, and air sealing means between said valve member and said carrier, said air sealing means permitting said movement of the valve member.

22. An apparatus for closing containers and the like, comprising, seaming mechanism arranged in a vacuum chamber having an opening therein, means in the chamber for moving containers from said opening and through the seaming mechanism back to said opening, a rotating conveyer mounted adjacent said opening and adapted to deliver containers thereto and to receive containers therefrom, said conveyer being arranged to close said opening while said chamber is under vacuum.

JOHN H. MURCH.